Jan. 20, 1970          KARL-ERIK A. JONSSON          3,490,665
          METHOD AND MEANS FOR GUIDING LOGS ONTO A PROCESSING MACHINE
Filed Feb. 6, 1968                                    4 Sheets-Sheet 1

INVENTOR
Karl-Erik A. Jonsson
by
Grees Maréchal Jr.

Jan. 20, 1970  KARL-ERIK A. JONSSON  3,490,665
METHOD AND MEANS FOR GUIDING LOGS ONTO A PROCESSING MACHINE
Filed Feb. 6, 1968  4 Sheets-Sheet 2
Fig.2
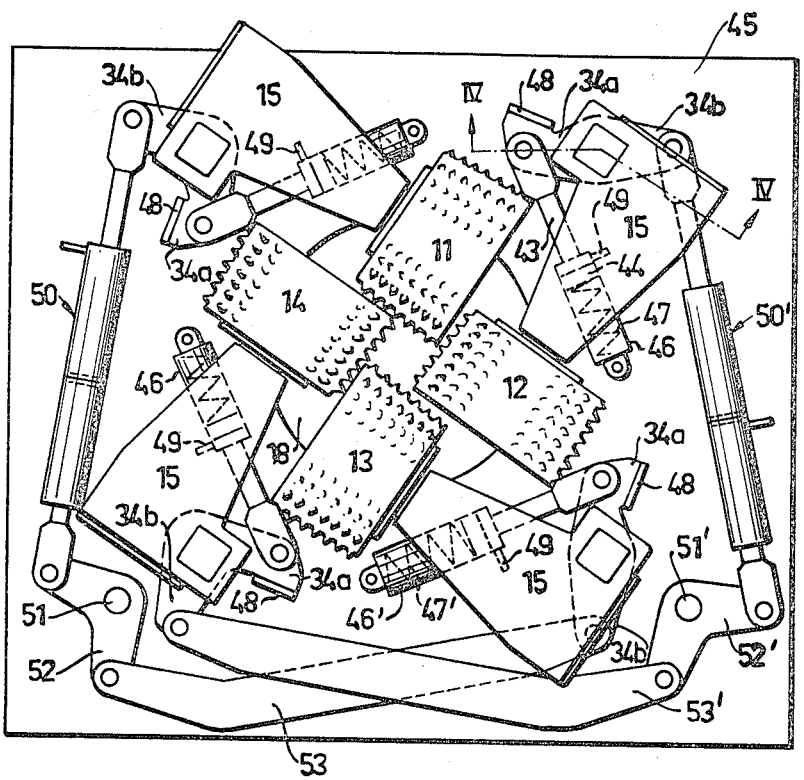
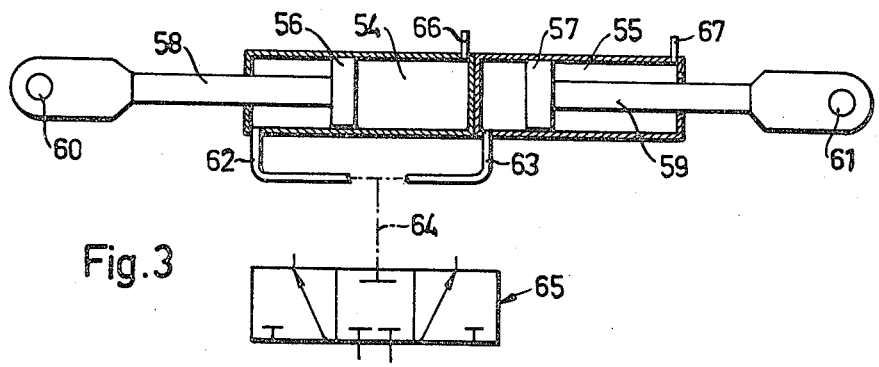
Fig.3
INVENTOR
Karl-Erik A. Jonsson
by
Green Marechal Jr.

Jan. 20, 1970  KARL-ERIK A. JONSSON  3,490,665
METHOD AND MEANS FOR GUIDING LOGS ONTO A PROCESSING MACHINE
Filed Feb. 6, 1968  4 Sheets-Sheet 3

INVENTOR
Karl-Erik A. Jonsson
by
Green Maréchal Jr.

Jan. 20, 1970   KARL-ERIK A. JONSSON   3,490,665
METHOD AND MEANS FOR GUIDING LOGS ONTO A PROCESSING MACHINE
Filed Feb. 6, 1968   4 Sheets-Sheet 4

INVENTOR
Karl-Erik A. Jonsson
by
Grees Maréchal

United States Patent Office 3,490,665
Patented Jan. 20, 1970

3,490,665
METHOD AND MEANS FOR GUIDING LOGS ONTO A PROCESSING MACHINE
Karl-Erik A. Jonsson, Gavle, Sweden, assignor to Brundell Jonsson Och AB, Gavle, Sweden, a corporation of Sweden
Filed Feb. 6, 1968, Ser. No. 703,388
Claims priority, application Sweden, Mar. 10, 1967, 3,345/67
Int. Cl. B65h 7/00, 11/00
U.S. Cl. 226—4                                   6 Claims

ABSTRACT OF THE DISCLOSURE

Logs are fed onto the inlet of a processing machine between spiked or fluted rollers resiliently engaging the log surface. To center the log in relation to said inlet the rollers are arranged to move synchronously in pairs or groups to and from the log surface. When the log has been centered, the rollers are released to move independently of each other to maintain the log in its centered position before said inlet independently of possible deformations of the log.

BACKGROUND OF THE INVENTION

Field of the invention

The invention relates to a method and means for guiding logs advanced in their longitudinal direction towards a processing machine, such as a sawing machine or a debarking machine, for instance.

Description of the prior art

To achieve a maximum yield of wood when sawing logs into battens and boards, it is necessary to center the logs as accurately as possible in relation to the inlet of the sawing machine. However, the plurality of logs are more or less crooked or exhibit other kinds of deformations, particularly a thickened butt end, so that a correct alignment has hitherto required a time consuming manual control which considerably reduces the rate of production.

SUMMARY OF THE INVENTION

The invention solves this problem by a guiding method which can to advantage be carried out entirely automatically and which renders it possible to center also crooked logs accurately before the inlet to a processing machine. In the known manner, a log is fed between cooperating rotatable rollers provided with rugged, preferably spiked or fluted peripheral surfaces and adapted to resiliently engage the log. According to the invention, the log is centered in relation to a central feed line by causing at least two rollers in at least one group of rollers to move synchronously to and from the surface of the log, and then the rollers are permitted to move independently of each other to and from the log surface, whereby the log engaging surfaces of the rollers will guide the log independently of its deformations in such a way that each point on the log surface moves in a substantially straight-line path in parallel to said central feed line. This special guidance is thus due to the fact that the engaging elements of the released rollers effectively engage the log surface.

A device for carrying out the method indicated above comprises pairs or groups of cooperating rotatable rollers having rugged, preferably spiked peripheral surfaces. A movable carrier for each roller is adapted to move its roller to and from a central feed line while maintaining the axis of the roller substantially perpendicular to said line, and a linkage connects the carriers of each pair or group of rollers to cause the rollers to move synchronously to and from said feed line. Further, each linkage includes a releasable clutch adapted, when released, to permit the rollers to move independently of each other. By releasing said clutches a log centered in a certain feed position by synchronized guidance can thus be caused to continue independently of deformations in such a way that each point on the log surface moves in a straight-line path in parallel to the central feed line. Preferably the rollers are driven, although this is not absolutely necessary, as the feed of the logs may also be carried out by other means.

The new guide means may be of various designs. For instance, it is possible to use a feeding device of the type shown in FIGURE 1 of the U.S. Patent 2,857,945, where three cooperating feed rollers have their shafts journalled in pivotable arms which are connected by links. For the purpose of the invention it is thus only necessary to insert releasable clutches in these links. If the guiding device includes a great number of rollers, these may be spaced around as well as along the feed line. In a preferred embodiment described below, the guiding device comprises two pairs of rollers movable to and from each other and interconnected by a linkage containing a releasable clutch. Preferably but not necessarily these pairs of rollers are disposed in a common plane perpendicular to the central feed line.

When carrying out the invention in practice, two or more feeding and guiding devices may be disposed in alignment at such intervals that always at least two of them engage a log simultaneously. The foremost feeding device may be disposed 1 to 2 metres before the inlet of a sawing machine, debarking machine or other processing machine, where a centered infeed is desired. In the majority of cases it then follows that two consecutive feeding devices together locate an advanced log along an average center line, and when the log thus centered is in a predetermined position the foremost log end, generally the butt end, may be caused to actuate a mechanism releasing the clutches of the rollers so that the log continues in the direction adjusted. For instance, this release may take place immediately in front of the inlet of the processing machine, but it may also occur at an earlier stage, in which case all subsequent guide rollers must be released from each other.

BRIEF DESCRIPTION OF THE DRAWINGS

The invention will be described in more detail with reference to an embodiment shown in the accompanying drawings.

FIGURE 2 is a front view of one of said devices with the fore wall of the frame removed. Also a drive transmission next to the rear frame wall has been omitted for gaining a better surveyability;

FIGURE 3 shows an axial section of a cylinder assembly serving as clutch;

DETAILED DESCRIPTION OF THE PREFERRED EMBODIMENT

Figure 1:
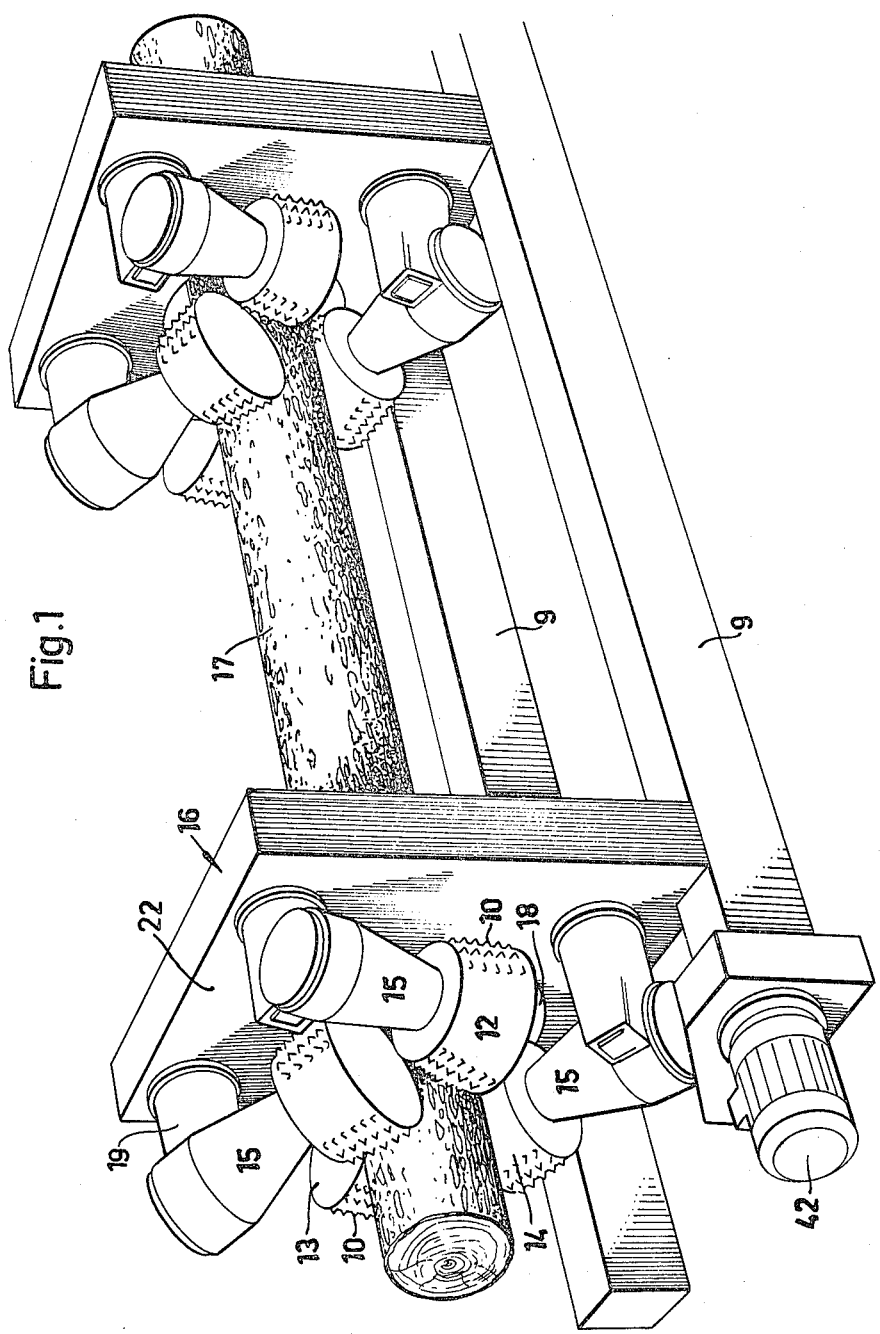
FIGURE 1 shows a perspective view of a feed work including two feeding and guiding devices in operation for advancing a log.

In FIG. 1, the two feeding devices are mounted one after the other on two longitudinal box girders 9. Each device has four cooperating rollers 11–14 provided with spikes 10. The rollers are disposed around a central feed line with their axes located in a common vertical plane perpendicular to the direction of feed. The rollers are supported at the outer ends of arms 15. The opposite ends of said arms are fixed to pivot shafts 19 rotatably journaled in a box-shaped frame 16 in such a way that the rollers may be pivoted in a common vertical plane towards and from the surface of a log 17 introduced between them. In the embodiment shown, the pivot shafts 19 are displaced laterally in relation to the axes of the rollers, and each roller is slightly conical in such a way that its log engaging surface portion has a generatrix which extends through the axis of the pertaining pivot shaft 19. The box-shaped frame 16 has a large central opening 18 dimensioned to permit the logs to pass.

Figure 4:
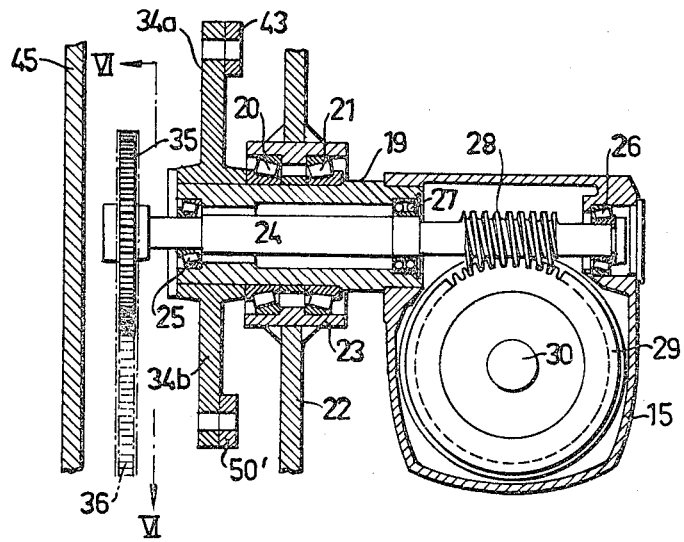
FIGURE 4 shows a cross section through a roll-carrying arm and its pivot on the line IV—IV in FIG. 2.
Figure 5:
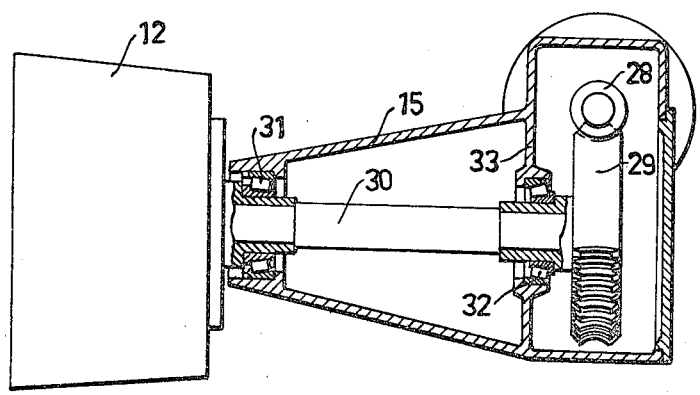
FIGURE 5 shows a longitudinal section through the roll-carrying arm.

As apparent from FIGS. 4 and 5, each arm 15 consists of a hollow member or housing enclosing a transmission, and the pivot shaft 19 is formed as a tubular cylinder secured to the arm 15. The cylinder 19 is journaled by means of roller bearings 20, 21 in a sleeve 23 secured to the fore wall 22 of the frame 16. A shaft 24 extending through the cylinder 19 and through adjacent part of the arm 15 is journaled in two roller bearings 25, 26 and in a ball bearing 27. Within the arm 15 a portion of shaft 24 is formed to a worm screw 28 which engages a worm gear 29. The latter is mounted on a shaft 30 extending axially through the arm 15 and carrying one of the rollers 11–14 at its outer end. The shaft 30 is journalled in a roller bearing 31 at the outer end of the arm 15 and another roller bearing 32 for said shaft 30 is mounted in a transverse wall 33 within the arm 15 next to the worm gear 29.

Figure 6:
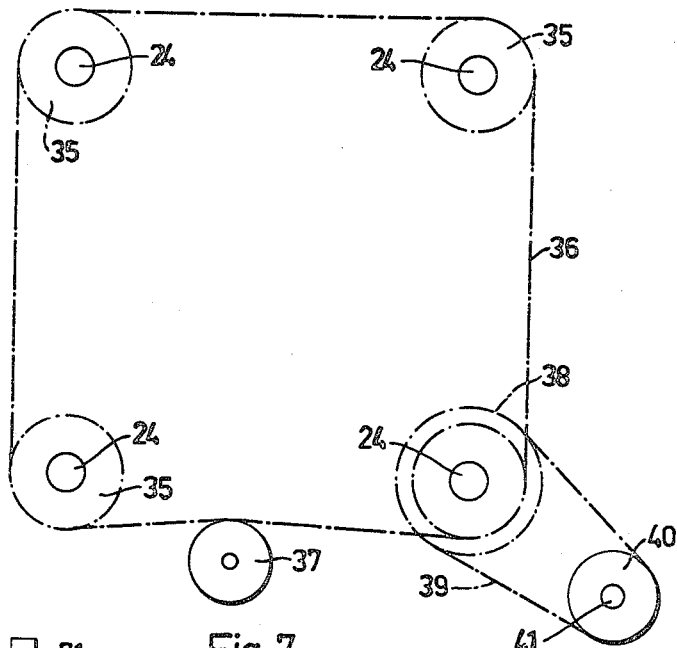
FIGURE 6 shows the drive transmission mentioned above in a plane in parallel to FIG. 2 on the line VI—VI in FIG. 4.

Inside the frame wall 22 a double-armed lever 34a, b is secured to the pivot shaft 19 of the arm 15, The function of this lever will be described hereinafter. The end of the worm screw shaft 24 protrudes from the cylinder 19 and carries a sprocket 35 wedged thereon. The sprockets 35 of the four rollers 11–14 are shown in FIG. 6. A chain 36 running over the sprockets 35 is kept tensioned by means of a jockey roller 37, and one of the shafts 24 (below to the right in FIG. 6) carries a further sprocket 38 which is driven by a chain 39 from a sprocket 40 on the shaft 41 of an electric motor 42 (shown in FIG. 1).

FIG. 2, where the fore frame wall 22 is removed, shows coupling means between the roller arms. Each of the levers connected to the pivot shafts 19 of the arms 15 has one end 34a linked to a piston rod 43, the piston 44 of which is movable in a cylinder 46 pivotably mounted on the rear wall 45 of the frame. In the embodiment shown, a helical spring 47 is inserted in the cylinder space behind the piston 44 to move the piston towards its outer limit position. The arrangement is such that the rollers 11–14 are normally swung to their inner positions, shown in FIG. 2, where the movements of the lever ends 34a are limited by stops 48 provided on the rear frame wall 45. If desired, said stops 48 may be adjustable. Instead of the helical springs shown for the sake of simplicity, it may be preferable to use other resilient forces, such as a pneumatic pressure or a combination of hydraulic and pneumatic power. In the latter case, the cylinder spaces behind the pistons 49 may be connected to a closed vessel containing a liquid which is subjected to a pneumatic pressure, when required. Conveniently, the cylinder 46' and the spring 47' pertaining to the lower roller 13 are dimensioned a little more powerful than the other resilient means 46, 47, as this roller 13 has to support the major part of the weight of the log.

A conduit indicated at 49 extends from the space before the piston 44 in the cylinder 46 to a valve, not shown, which alternatively connects the conduit 49 to a source of hydraulic pressure or to a storage tank. When the conduit is connected to the source of pressure, the rollers 11–14 are moved outwardly from each other because the piston rods 43 are moved into the cylinders 46 against the action of the springs 47. If a pneumatic or hydraulic-pneumatic pressure fluid has been substituted for the springs, said pressure must of course be relieved, before pressure fluid is supplied to the outer cylinder spaces. Preferably, all the conduits 49 are controlled by a common valve.

The rollers 11, 13 or 12, 14, which engage diametrically opposed points on the log surface, have their pivot shafts 19 connected by a linkage coupled between the lever arms 34b. Thus, the arm 34b associated with the roller 11 is by a link 50 connected to one end of a bell crank 52 pivotably journalled at 51, and the other end of said bell crank 52 is coupled by a link 53 to the lever 34b of the roller 13. A linkage 50'–53' designed identically alike connects the lever arms 34b of the other pair of rollers 12, 14. As will be explained hereinafter, one of the links in each linkage (the link 50 or 50') constitutes a releasable clutch, but as long as said links 50, 50' function as rigid connections the arrangement is such that the two rollers in each pair of rollers may be moved synchronously towards and from the center line extending through the center of the opening 18 in the frame 16.

In the embodiment shown in FIG. 3, each of the links 50, 50' consists of two hydraulic cylinders 54, 55 secured coaxially to each other in such a way that the piston rods 58, 59 of the pistons 56 and 57, respectively, protrude in opposite directions. The outer ends of the piston rods 58, 59 are provided with eyes 60, 61 to be connected to a lever arm 34b and to a bell crank 52 or 52', respectively. A conduit 62 from the outer end of the cylinder 54 and a conduit 63 from the inner end of the cylinder 55 are combined to one single conduit 64 which extends to a two-position valve indicated diagrammatically at 65. By means of this valve 65 the conduit 64 may either be connected to a source of pressure fluid (an oil pump) or to a storage tank. Further, the cylinder 54 is provided with a leakage opening 66 at its inner end, and the cylinder 55 has a leakage opening 67 at its outer end.

When the conduits 62, 63 are in communication with the source of pressure fluid, the piston 56 is in its inner position with the piston rod 58 retracted, while the piston 57 is in its outer position with the rod 59 protruded. Thus, in this condition the cylinders 54, 55 and the piston rods 58, 59 together form a rigid link which only permits the pair of rollers 11, 13 or 12, 14 to swing synchronously. When the valve 65 is switched over to relieve the pressure in the cylinders, it becomes possible for the pistons 56, 57 to move freely, and the distance between the connection eyes 60, 61 of the piston rods may be shortened or lengthened. The links 50, 50' have ceased to function, and all the rollers 11–14 may be swung independently of each other. Conveniently, one single valve 65 may be adapted to serve the links 50, 50' comprised in both linkages.

The device described above functions as follows. Initially, the rollers 11–14 are kept in their outermost positions at a maximum distance from each other by supply of pressure fluid to the outer ends of the cylinders 46, and the valve 65 is set in such position that the piston rods 58, 59 comprised in the links 50, 50' are kept locked by supply of pressure fluid to the cylinders 54, 55. Now, when a log forwarded by a preceding conveyor enters with its foremost end between the rotating rollers 11–14 in the first feeding device, the valve connected to the conduits 49 is adjusted to relieve the pressure on the outer sides of the pistons 44 so that the springs 47 move the rollers into engagement with the log surface. Owing to the synchronization of the rollers of each pair, the log is centered in the opening 18 in the frame during its continued advancement. The same procedure is repeated when the foremost log end enters between the rollers in the following feeding device. Said adjustment of the valve controlling the conduits 49 is preferably made automatically by means of the fore log end which may actuate a movable setting member or may break a ray of light directed onto a photocell, before it enters the opening 18 in the frame 16.

Figure 7:
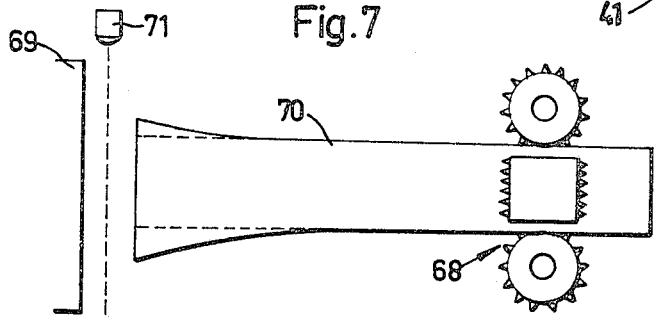
FIGURES 7 and 8 show diagrammatically the function of the feed work when advancing a deformed log.

The most common log deformation is a thickened butt end, and only at a distance of 1.0 to 1.5 metres from said end is there a reasonable security that the log has its normal shape. As logs are generally conveyed to a sawing machine with the butt end foremost, it is of course desirable to arrange such that a deformed fore log end does not influence the centering of the log immediately before the sawing machine. In FIG. 7, a first feeding device 68 of the kind described is placed at a distance of 1.0–1.5 metres before the inlet of a sawing machine indicated at 69, and a second feeding device of the same kind (not shown in FIG. 7) may be placed at such distance behind the first one 68 that it supports the rear end of the log 70 when the fore log end (butt end) is located immediately before the sawing machine. In this position, the fore log end may be caused to break a ray of light directed from a source of light 71 onto a photocell 72 which then adjusts the valve 65 to release the clutches 50, 50' between the rollers of the two feeding devices. Regardless of any deformity on the log portions thereafter passing through the feeding device, the centered log will now be fed along the center line already fixed. The distance between the two feeding devices controlled simultaneously should be less than the whole length but greater than half the length of the log.

Figure 8:
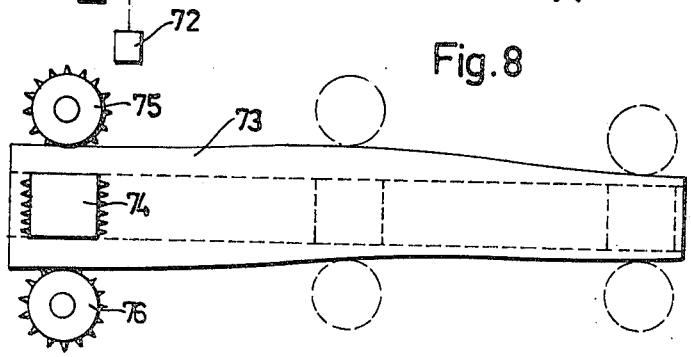

The guiding action obtained by the invention is better illustrated in FIG. 8 which shows a crooked log 73 passing through a feed work. When the rollers have been released from each other, they are moved separately into contact with the irregularities of the log surface, and at the same time the roller spikes engage the log surface and prevent a lateral displacement of the log so that each point on the log surface moves in a straight-line path. In FIG. 8, the rectilinear movement in a tangential plane of a roller 74 in parallel to the plane of the drawing is indicated by broken lines, which show that the centering carried out previously is not influenced by the irregularities of the log surface. At the same time, two rollers 75, 76 with axes perpendicular to the plane of the drawing are displaced unsymmetrically by the irregularities of the log so that the log is maintained in its centered position.

The structural details described above may be modified in several respects. For instance, it is possible to use other releasable clutch means, and the rollers may be provided with guide members of some other kind, such as peripheral ribs etc. In certain cases, one single guiding device may be sufficient, if the rear end of the log is supported by a suitable conveyor. On the other hand, more than two guiding devices may be placed one after the other, although the centering described is preferably carried out by means of two devices.

What is claimed is:

1. A method of guiding a log in its longitudinal direction onto the inlet of a processing machine, in which the log is fed between cooperating rotatable rollers provided with rugged, preferably spiked, peripheral surfaces and adapted to resiliently engage the log, comprising centering the log in relation to a central feed line by causing at least two rollers in at least one group of rollers to move synchronously to and from the surface of the log, and then permitting the rollers to move independently of each other to and from the log surface, whereby the log engaging surfaces of the rollers will guide the log independently of its deformations in such a way that each point on the log surface moves in a substantially straight-line path in parallel to said central feed line.

2. Means for guiding logs onto the inlet of a processing machine, such as a sawing or debarking machine, for instance, comprising pairs or groups of cooperating rotatable rollers having rugged, preferably spiked, peripheral surfaces, a movable carrier for each roller adapted to move its roller to and from a central feed line while maintaining the axis of the roller substantially perpendicular to said line, a linkage connecting the carriers of each pair or group of rollers to cause said rollers to move synchronously to and from said feed line, and a releasable clutch in each linkage adapted, when released, to permit the rollers to move independently of each other, so that a log advanced along the central feed line is guided independently of its deformations in such a way that each point on the log surface will move in a substantially straight-line path in parallel to said central feed line.

3. Means for guiding logs as claimed in claim 2, in which two pairs of rollers are arranged substantially symmetrically around a central feed line, the carriers of the rollers in each pair being connected by a linkage including a releasable clutch.

4. Means for guiding logs as claimed in claim 3, in which each clutch consists of two hydraulic cylinders secured to each other and having pistons with rods projecting in opposite directions to serve as connecting links, the outer end of the first cylinder and the inner end of the second cylinder being adapted to be connected to a source of hydraulic pressure for locking the piston of the first cylinder in its inner position and the piston of the second cylinder in its outer position.

5. Means for guiding logs as claimed in claim 4, in which a two-position valve controlling the supply of pressure fluid to said cylinders is adjustable in its relieving position by means of a signal member which is influenced by a log advanced into a predetermined position.

6. Means for guiding logs as claimed in claim 1, in which the carriers of the rollers consist of arms secured to rotatable shafts which extend in parallel to the feed line, characterized in that the log engaging surface portion of each roller has a generatrix extending through the axis of the shaft of the carrier arm.

References Cited

UNITED STATES PATENTS

| | | | |
|---|---|---|---|
| 2,785,715 | 3/1957 | Brundell et al. | 143—55 X |
| 2,897,859 | 8/1959 | Annis | 143—55 X |

M. HENSON WOOD, Jr., Primary Examiner

U.S. Cl. X.R.
226—177, 187, 193

UNITED STATES PATENT OFFICE

CERTIFICATE OF CORRECTION

Patent No. 3,490,665           Dated January 20, 1970

Inventor(s) KARL-ERIK A. JONSSON

It is certified that error appears in the above-identified patent and that said Letters Patent are hereby corrected as shown below:

Column 1, lines 4-5, the assignee should be shown as --Brundell och Jonsson AB--.

SIGNED AND SEALED

JUL 21 1970

(SEAL)
Attest:

Edward M. Fletcher, Jr.
Attesting Officer

WILLIAM E. SCHUYLER, JR.
Commissioner of Patents